United States Patent Office 2,785,120
Patented Mar. 12, 1957

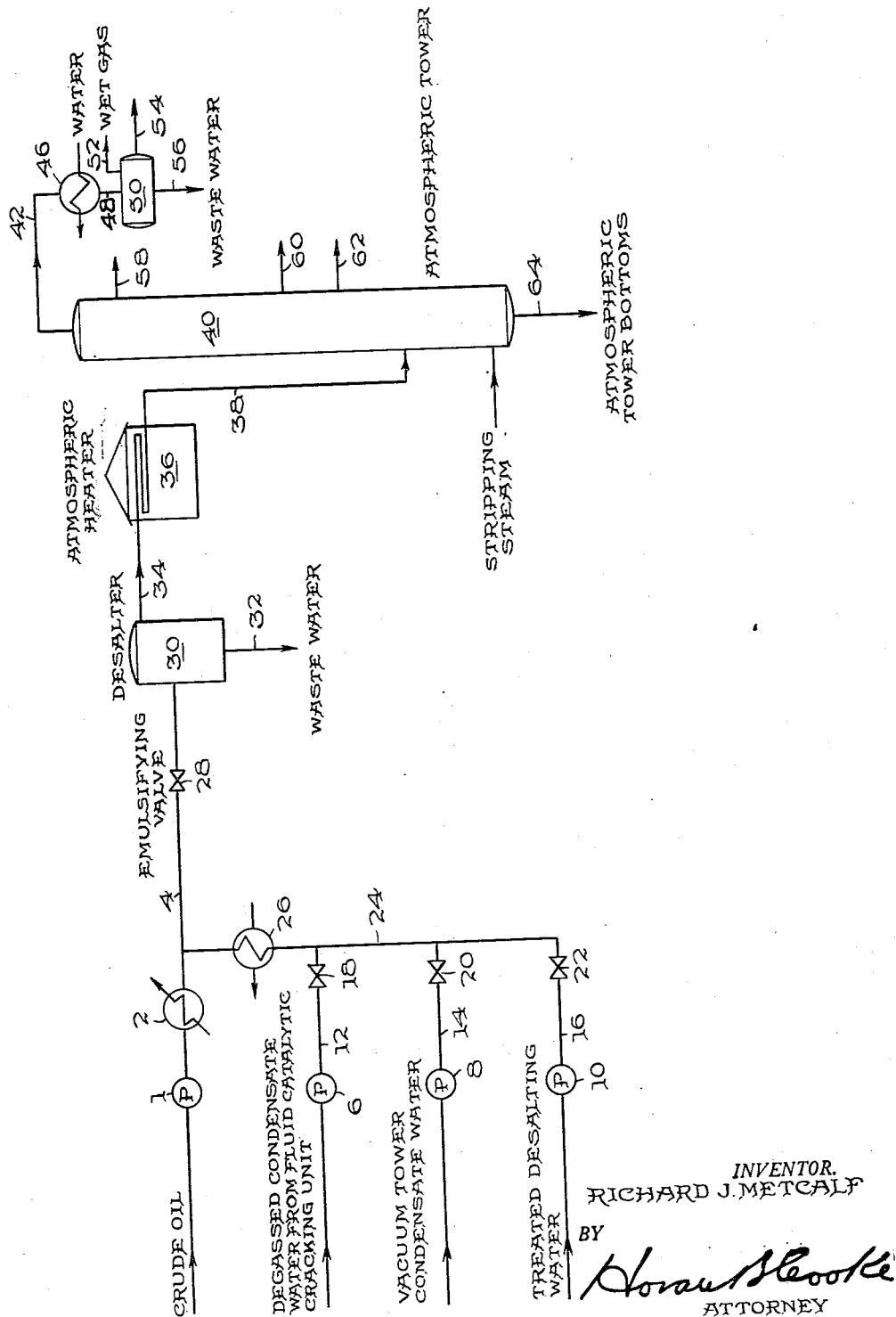

2,785,120

PROCESS FOR PHENOL RECOVERY AND CRUDE OIL DESALTING

Richard J. Metcalf, Havertown, Pa., assignor to Gulf Oil Corporation, Pittsburgh, Pa., a corporation of Pennsylvania Application August 29, 1952, Serial No. 307,077

4 Claims. (Cl. 204—190)

This invention relates to a process for phenol recovery and crude oil desalting, and more particularly to a process involving the mutual extraction of inorganic salts from crude petroleum oil into aqueous industrial liquors and phenolic materials from said aqueous liquors into crude oils.

The disposition of aqueous industrial liquors containing appreciable amounts of phenolic bodies is a problem with which numerous industries are concerned. Such liquors are produced in various processing operations wherein an aqueous material is contacted with a second material which contains phenolic materials and which is capable of surrendering at least a portion of its phenolic content into the processing water. Formerly, such liquors were disposed of by direct or indirect discharge into public waterways, without previous treatment.

However, in view of the adverse effect of phenolic materials on biological life, and in view of the objectionable odor and taste imparted to drinking water by phenolic materials, many States and municipalities have adopted legislation prohibiting discharge of such phenolic industrial liquors into local waterways. With the advent of such legislation and other forces, the problem has become progressively more pressing.

Numerous treating operations have been suggested for removing or reducing the phenolic content of aqueous industrial liquors, ozonation and chlorination being examples of two such processes. From an over-all standpoint, however, previously employed processes have met with only limited approval, particularly in instances where extremely large quantities of such liquors are involved and/or where high phenolic concentrations are present, because of the high initial capital outlay, high operational costs, and/or limitations with respect to the maximum phenolic content of waters which may be successfully treated by such process.

A normally separate and distinct problem of the petroleum refining industry is concerned with the removal of inorganic salts from petroleum crude oils in order to prevent equipment corrosion and/or erosion. Desalting of crude petroleum oils is normally achieved by what amounts fundamentally to an aqueous extraction of inorganic salts from the crude oil with fresh or specially treated desalting water.

It is an object of this invention to achieve a reduction in the phenolic content of aqueous industrial liquors containing phenolic materials and to achieve the desalting of crude petroleum oil in a single operation. It is an additional object to achieve this result without large capital investment or operational costs. It is a further object to reduce or eliminate entirely the use of relatively costly, specially treated, desalting water in the desalting of crude petroleum oil. It is a further object to recover a substantial portion of the phenols contained in the aqueous industrial liquors in the form of salable products. It is still another object to effect certain improvements in the desalting of crude petroleum oil and certain subsequent refining operations. It is a particular object of the invention to reduce substantially the phenol content of petroleum refinery process water recovered subsequent to refining operations involving the contact of an aqueous material with a phenolic petroleum oil, such as, for example, phenolic condensate water recovered subsequent to the fluid catalytic cracking of a petroleum oil in the presence of steam. Other objects will appear hereinafter.

These and other objects are accomplished by the invention which comprises intimately contacting a crude petroleum oil containing inorganic salts with an aqueous industrial liquor containing phenolic materials, and separating an aqueous phase relatively enriched in inorganic salts and an oil phase relatively enriched in phenolic materials.

In the following description and in the attached drawing certain preferred embodiments of the invention have been described and shown. It is understood that these are by way of illustration only and are not to be considered as limiting.

Referring briefly to the attached drawing, there is shown in simplified form a flow sheet illustrating the principles of the invention and the sequence of steps followed.

The invention is suited to the reduction of the phenolic content of any aqueous industrial liquor containing appreciable concentrations of phenolic bodies, regardless of the source of these liquors. Examples of such aqueous industrial liquors are waste liquors obtained from coal tar distillation plants, weak ammonia liquors, and petroleum refinery process waters.

The invention is not limited to the removal of any particular type of phenolic material and may be used successfully to remove monohydroxy phenols, polyhydroxy phenols, mononuclear aromatic phenols, polynuclear aromatic phenols, substitution products thereof, and the like. Nor is the invention limited to aqueous industrial liquors containing particular concentrations of phenolic materials. The invention may be used quite satisfactorily in connection with aqueous liquors containing any objectionable concentration of phenols. Normally, concentrations of 10 p. p. m. phenols or greater are considered objectionable.

Although the invention is suited to the reduction of the phenolic content of aqueous industrial liquors containing relatively small concentrations of phenols, the greatest advantages are produced in connection with the reduction of the phenolic content of aqueous industrial liquors containing relatively high concentrations of phenols. This is true, since the invention, as most single-stage extraction processes, normally does not effect complete removal of phenols from the waste liquors. Accordingly, the percentage of removal is greatest in connection with aqueous liquors containing high concentrations of phenolic materials. Contrary to certain previously employed phenol-recovery processes, the operational costs of the present invention do not increase with increasing phenolic content of the aqueous liquors.

Although the invention is suited for the removal of phenols from any aqueous industrial liquors containing the same, it is particularly adapted for the removal or reduction of the phenolic content of petroleum refinery process waters. This is true, for the reason that one feature of the invention involves the desalting of crude petroleum oil. It is therefore most convenient to utilize phenolic water produced in the refinery.

Numerous sources of phenolic waste waters may arise from the refining of petroleum. Any operation involving the contact of a phenolic petroleum oil with an aqueous material and subsequent recovery of the latter is a potential source of phenolic waste water. For example, operations involving the distillation of phenolic petroleum oils normally employ steam to facilitate vaporization of less volatile components of the oil. This steam is normally introduced into the stripping zone of a fractionating tower and may also be introduced into the vaporizing zone together with the feed to the tower. In addition, steam may be utilized to strip liquid products removed from trays at various elevations in the fractionating tower. Steam from these sources is condensed with distillation products and separated therefrom. Another source of phenolic waste water arises in the recovery of phenolic materials used in the phenolic-solvent extraction of petroleum oils. Such phenolic solvents are often recovered by steam distillation, thus producing condensate water containing phenol.

By phenolic petroleum oil is meant a petroleum oil which contains free phenolic materials, or a petroleum oil which will, upon partial decomposition of certain constituents thereof, yield phenolic materials. While crude oils generally contain appreciable concentrations of phenolic materials, per se, authorities agree that additional phenolic materials may be formed in the partial decomposition of certain components of the crude oil.

Since phenolic materials are often concentrated in the heavier ends of a crude petroleum oil, an important source of phenolic process water is found in the distillation of high boiling phenolic petroleum oils, such as in the vacuum distillation of reduced crude oil, or in the vacuum distillation of bright stock solution, in the presence of steam. The steam utilized in the vacuum distillation of petroleum oil is normally recovered as condensate water from an overhead take-off line of the vacuum tower.

As indicated above, phenolic materials may be formed from the partial decomposition of certain constituents of the crude oil. Accordingly, a highly important source of phenolic water in petroleum refineries is water recovered subsequent to pyrolytic conversion processes, such as the coking of high boiling petroleum oils in the presence of steam and an inert contact material, or pyrolytic conversions carried out in the presence of steam and catalytic contact material, such as catalytic cracking carried out with a fixed bed, moving bed, or fluidized bed of catalyst. The phenolic water resulting from such operations may originate as reaction steam or as stripping steam used in the subsequent fractionation of the converted products.

Perhaps the largest single source of process waters of high phenolic content in a petroleum refinery is that arising from the fluidized catalytic conversion of petroleum oils. In such operations large quantities of steam are utilized as reaction steam, as stripping steam for strippnng deactivated catalytic particles, as well as in the subsequent fractionation of the converted products. Since the invention is particularly adapted to the treatment of large quantities of waste water containing relatively high concentrations of phenols, the invention is especially suited for the treatment of waste water recovered subsequent to a fluid catalytic conversion reaction such as fluidized catalytic cracking.

Over and above the obvious benefits of removing phenols from waste water from a catalytic cracking unit is the fact that treatment of this material according to the principles of my invention results in additional benefits in certain refining steps subsequent to the desalting operation. For example, in the atmospheric fractionation of desalted crude oil, it is customary to inject substantial quantities of ammonia gas into the atmospheric tower distillation system in order to neutralize certain acidic constitutents thereof and thereby to prevent corrosion of equipment. I have found that the use of waste water, recovered subsequent to the catalytic cracking of petroleum oil, in the desalting of crude oil effects the neutralization of these acidic constituents, so that the injection of ammonia into the atmospheric tower overhead may be reduced or eliminated entirely. It is therefore particularly advantageous to utilize waste water recovered subsequent to the catalytic cracking of a phenolic petroleum oil. The neutralization of acidic constituents in the crude oil is apparently achieved by various ammonium compounds present in condensate water recovered subsequent to the catalytic cracking reaction.

The invention is adaptable to the desalting of any crude petroleum oil containing inorganic salts. It may be mentioned that the bulk of all crude oil now produced contains inorganic salts. Moreover, as far as the success of the phenol reduction aspect of the invention is concerned, it is immaterial whether or not the crude oil contains phenolic materials as such or potentially phenol-forming materials. In instances where the crude oil contains little or no phenolic materials or materials capable of forming phenols, the invention is admirably suited to the removal of phenols from aqueous industrial liquors obtained from the operation of plants not associated with the refining of petroleum. However, under normal conditions the crude oil being treated will contain appreciable quantities of phenolic materials, per se, as well as materials which are capable of forming phenols. Under such conditions the invention is particularly suited to the removal of phenols from waste waters produced in the refinery.

The removal of salt from the crude oil is not merely incidental to the phenol removal step. Rather, the transfer of salt from the crude to the desalting water contributes materially to the success of the transfer of phenols from the desalting water to the crude. This is true, since inorganic salts, notably sodium chloride, when dissolved in water, tend to reduce the solubility of phenols in the water. Accordingly, the salts in the crude oil have a greater affinity for the desalting water than the crude oil and tend to move in that direction. Phenols in the desalting water are thereby forced out of the desalting water into the crude oil.

The intimate admixture of the crude oil and the aqueous phenolic liquor is accomplished according to conventional desalting procedures and conditions. A description of several commercial desalting procedures is found at pages 218–222 of The Petroleum Refiner, vol. 27, No. 9.2, September 1948, Process Handbook Edition. As stated above, the desalting of crude petroleum oil fundamentally involves an aqueous extraction of the crude oil with a filtered and/or chemically treated desalting water. Various commercial desalting operations differ among themselves primarily in the method by which the resulting mixture or emulsion of oil and water is separated. The separation of the mixture of the oil and water mixture or emulsion by settling may be facilitated for example by mechanical treatment, such as by heat and agitation, centrifuging and/or filtration, by chemical treatment, as by the addition of chemicals such as aqueous caustic soda solution, by a combination of chemical and mechanical treatments, or by electrical treatment, such as by subjecting the oil and water mixture or emulsion to the action of a relatively high-intensity electric field, whereby the emulsified particles are caused to coalesce and settle out. The invention is applicable to any of these conventional desalting procedures. Regardless of the particular emulsion breaking steps employed, it has been found that the use of phenolic water as a desalting medium produces a quicker breaking emulsion. This is of distinct advantage, since less oil is lost through emulsification, and since less settling equipment capacity is required.

Although the invention may be used with success in connection with any conventional desalting procedure, it has particular advantages in connection with those involving the use of an electrical field to break the emulsion. In connection with this type of process, it has been found that substantially less electric power is necessary to maintain the potential gradient required to break the oil and water emulsion resulting from the extraction step. An appreciable savings in electrical power consumption results therefrom.

As indicated above, the extraction step of the process is carried out according to conventional desalting conditions, except for the substitution of aqueous phenolic liquors for normally employed filtered and/or chemically treated or fresh desalting water. The aqueous phenolic liquor may be substituted for the fresh or treated desalting water on a barrel for barrel basis with entirely successful results. The ratio of water to oil in desalting operations may vary widely according to the conditions of the extraction, the characteristics of the crude and the salt content thereof. Generally speaking, a water volume of from about 2 percent to about 15 percent of the crude oil volume is satisfactory for most crude oils. Out of consideration for water economy, desalting operations normally involve the use of water in an amount of about 7 percent to about 7.5 percent of the volume of crude. The invention is very flexible in that where the phenolic water produced is more than the normally used ratio of 7 percent to 7.5 percent by volume of the crude, the ratio can be increased up to about 15 percent by volume of the crude with entirely satisfactory results.

With respect to the temperature of the desalting operation, the mutual extraction proceeds favorably at normal atmospheric temperatures. However, in order to reduce the viscosity of the oil and to facilitate the increased solubility of the extracted materials in the respective extracting media, it is normally desired to carry out the desalting step at elevated temperatures. This may be accomplished for example by heating at least one of the components of the mixture, either the oil or the water, to a degree sufficient to produce the desired extracting temperature, or alternatively by heating both components. Satisfactory extracting temperatures are between about 140° F. and about 250° F., with as high as about 350° F. being used in isolated cases. Higher or lower temperatures may be utilized. In the absence of pressure equipment, the highest desalting temperature normally used is not substantially more than about 200° F. The temperature should in no case be sufficient to decompose the oil or entirely to vaporize the desalting water at the pressure of the system. Desalting processes utilizing electrical action to facilitate emulsion breaking normally are operated at between about 140° F. and about 240° F.

The total time of contact between oil and water varies according to the crude oil charge rate, the viscosity of the oil, the water:oil ratio, the degree of mixing, and other factors. The use of elevated temperatures and thorough mixing devices reduces the necessary contact time. The time of settling may vary greatly according to the means utilized to break the emulsion, the crude oil charge rate, the viscosity of the oil, etc. Emulsion breaking procedures involving, in addition to settling, chemical, mechanical or electrical treatment of the emulsion reduce the settling time required.

Intimate contact between the oil and water is satisfactorily achieved by the use of an emulsifying valve. Alternatively, other means may be employed for this purpose, for example, mixing pumps and mechanical or gaseous agitation.

The operation of the invention may be understood more fully by more detailed reference to the attached drawing, which illustrates schematically a preferred form of the invention.

In operation, crude oil enters the system through pump 1 and line 4. Preheating of the crude is effected by passage through heater 2. Phenolic condensate water recovered subsequent to the fluid catalytic cracking of a petroleum oil, preferably degassed to remove hydrogen sulfide, is introduced into the system by pump 6 and line 12. Additional phenolic water, obtained from the condensate drum of a vacuum fractionating tower, is introduced into the system by way of pump 8 and line 14. If the condensate water from the fluid catalytic cracking unit together with the vacuum tower condensate water is insufficient to provide the desired proportion of desalting water, these water streams may be augmented with the above-described fresh or treated desalting water which may be introduced into the system by way of pump 10 and line 16. Alternatively, phenolic water from one or more additional sources may be utilized in place of the water introduced through line 16.

Water from any or all of the sources mentioned above is proportioned in the desired amount into line 24 by means of valves 18, 20 and 22. The phenolic desalting water passes from line 24 through heater 26, where it is heated to the desired degree by indirect heat exchange. The phenolic desalting water is mixed with the crude oil charge at the intersection of line 24 with line 4. The mixture of oil and water passes from this zone of initial mixing through emulsifying valve 28, where thorough and intimate contact between water and oil is produced. The pressure drop across valve 28 varies according to the oil being processed and normally ranges from about 3 p. s. i. to about 75 p. s. i.

From emulsifying valve 28 the oil and water emulsion passes into desalting unit 30. Although only one desalter is shown in the drawing, several such units are normally employed in commercial installations. In desalter 30 the emulsion is subjected to the action of a relatively high-intensity electrical field between a pair of electrodes, not shown, and is allowed to settle. The current supplied to the electrodes may be either alternating or direct. As indicated hereinabove electrostatic forces cause the coalescence of the emulsified water particles. An aqueous layer is formed at the bottom of desalter 30, from which water relatively enriched in inorganic salts is drawn off.

The oil phase, relatively enriched in phenolic materials obtained from the desalting water, is simultaneously removed from the top of desalter 30 by way of line 34 and is directed into a heater 36 in order to raise it to the temperature in the subsequent atmospheric fractionation tower 40. The preheated, desalted, phenol-laden crude oil passes into the vaporizing section of atmospheric tower 40 by way of line 38. Atmospheric fractionation of the crude oil into various cuts is effected in tower 40 in a conventional manner.

Stripped atmospheric tower bottoms are withdrawn from the bottom of tower 40 through line 64. These bottoms are then customarily passed into a vacuum tower heater, not shown, and thence into a vacuum fractionating tower, not shown, for vacuum fractionation of the heavier cuts of the oil and separation thereof from vacuum tower bottoms.

Vapors from tower 40, including used stripping steam from the stripping section of the tower, passes overhead into line 42. Overhead vapors pass from line 42 into cooler 46 for cooling and condensation and thence, by way of line 48, into drum 50. Waste water of relatively low phenol content separates out in drum 50 and is withdrawn therefrom by way of line 56. Wet gas is withdrawn from the top of drum 50 by way of line 52. Condensed overhead hydrocarbon vapors are removed from drum 50 by way of line 54.

The desired number of fractionated cuts are withdrawn as side streams from trays at appropriate levels within atmospheric tower 40 by means of lines 58, 60 and 62. These side streams may comprise, respectively, for example, naphtha, No. 2 fuel oil, and atmospheric gas oil.

In the operation of the apparatus shown in the drawing, water of quite low phenolic content and of relatively high salt content is withdrawn from line 32. Additional water of relatively low phenolic content is withdrawn by way of line 56. Experiments indicate that the largest amounts of phenolic materials (originally contained in the desalting water) are removed from the system in the heavier cuts from the atmospheric tower; for example, No. 2 fuel oil. This is somewhat surprising in view of the fact that when No. 2 fuel oil itself was tested as a possible solvent medium for removing phenols from phenolic process waters, this material showed little affinity therefor. The inclusion of phenolic materials in various fractions of the oil is advantageous from the standpoint of increasing the salable volume of such fractions.

The results obtained by the invention are typified by the following example:

EXAMPLE I

A plant scale run of six hours duration was carried out by charging a mixture of 55 percent Kuwait crude and 45 percent Mara crude, preheated to about 198° F., at the rate of 407,592 pounds per hour to a Petreco electrical desalting unit. Simultaneously phenolic process water, preheated to about 180° F., was charged to the desalters at the rate of 30,560 pounds per hour. This water was made up in part of degassed condensate water obtained from a fluid catalytic cracking unit used for cracking gas oil stock, during the fractionation of the cracked product. This portion of the phenolic water was charged at the rate of 22,555 pounds per hour. The balance of the desalting water was condensate water from a vacuum fractionation tower used for vacuum fractionation of reduced crude oil and was charged at the rate of 8005 pounds per hour. The condensate water from the fluid catalytic cracking unit averaged 537 p. p. m. phenols, or an amount equivalent to a charging rate of 12.112 pounds per hour of phenols. The condensate water from the vacuum fractionation tower averaged 156 p. p. m. phenols or an amount equivalent to a charge rate of 1.249 pounds per hour phenols.

Waste water from the desalters and from the atmospheric tower reflux drum was tested for phenolic content. A distinct reduction was observed.

The drawoff water from the desalters was distinctly clearer than usual, indicating a quicker and more complete resolution of the emulsion in the desalters under the method of the present invention. It was also found that substantially less power was consumed in maintaining the electrical potential gradient across the electrodes of the desalters. It was further found that the pH of the atmospheric tower overhead was sufficiently high (about pH8) as to entirely eliminate the necessity for ammonia injection therein. This compares with a pH of about 4 normally observed in the absence of ammonia injection.

The reduction in the phenolic content of the desalting water and in the salt content of the crude are illustrated in the following tabulations:

Table A

|  | Flow Rate, Lbs./Hr. | Phenols | |
| --- | --- | --- | --- |
|  |  | P. p. m. | Lbs./Hr. |
| Water Streams to Desalters: |  |  |  |
| Water from vacuum System Concensate Drum | 8,005 | 156 | 1.249 |
| Fluid Unit Waste Water (Treated Water from Degassing Drum) | 22,555 | 537 | 12.112 |
| Total |  |  | 13.361 |
| Water from Desalters | 30,560 | 24.5 | 0.749 |
| Water from Atmospheric Tower Reflux Drum | 15,343 | 79.9 | 1.226 |
| Total |  |  | 1.975 |
| Total Phenols in Water to Desalters, lbs./hr. |  | 13.361 |  |
| Total Phenols in Water from System, lbs./hr. |  | 1.975 |  |
| Difference, lbs./hr. |  | 11.386 |  |

From the figures presented in Table A above it will be apparent that phenols are removed from the desalting water in an amount corresponding to a rate of 11.386 pounds per hour. This constitutes a reduction of more than 85 percent of the phenols originally contained in the desalting water. From the foregoing table it will also be seen that the total phenol content of all the effluent aqueous fractions from the system, other than the phenolic steam condensate fraction obtained from the fluid catalytic cracking unit, was substantially less than the phenol content of the aqueous fraction obtained from the fluid catalytic cracking unit.

As will be evident to those skilled in the art, in the foregoing plant scale run the desalted crude oil was passed from the desalters to the atmospheric distillation tower where the crude oil was subjected to distillation at atmospheric pressure in the presence of steam. The atmospheric tower bottoms in turn were passed to the vacuum distillation tower where these bottoms were subjected to further distillation at reduced pressure and in contact with steam, to obtain the gas oil fraction that was charged to the fluid catalytic cracking unit. Cracked products from the fluid catalytic cracking unit were then subjected to distillation in contact with steam in a fractionating tower. The steam condensate recovered from the fractionation subsequent to catalytic cracking was the "fluid unit waste water" referred to in Table A.

Table B, below, illustrates the extent of removal of inorganic salts from the crude oil during the run described.

Table B

Lbs./1000 bbls.
Crude oil, salt content in_____ 44
Desalted crude, salt content out_____ 1

The waste water, greatly reduced in phenolic content, may be discharged directly into waterways or sewers in instances where the phenolic content is sufficiently low. Where the phenolic content of these waste waters is greater than the minimum permissible for direct discharge into sewers or local waterways, this water may be diluted to a satisfactory degree with other waste water, containing lesser amounts of phenols, or alternatively, this water may be treated according to any conventional phenol removal procedure such as by ozonation treatment or chlorination, at a substantially lower cost than the cost of such treatment of the original waste water.

In addition to the plant scale run described above, other tests have been made over much longer periods of time using crude oil charges of varying composition and of varying salt content and using desalting water containing varying amounts of phenolic materials. The results obtained in these runs substantiated in full those described herein.

An important aspect of the invention is that little modification of existing equipment is required.

Normally, the sole modification of conventional equipment required to practice the invention is to provide the necessary lines and valves and pumps for conducting the phenolic waste water to the desalters. Such modification may be made at low cost.

In order to illustrate the extent of the power savings involved in electrical desalting according to the present invention, comparative runs of thirty minutes duration were made under substantially identical conditions, except that in the first run, Run 1, desalting was effected with chemically treated and filtered desalting water and in the second, Run 2, desalting was effected with phenolic waste water recovered subsequent to the fluidized catalytic cracking of a phenolic petroleum oil. The results obtained are presented in Table C. In these runs the volts and amperes to each of the ten desalters included in the test were measured and recorded. The total power consumption was then determined from these figures with the use of the indicated power factor.

Table C
RUN 1.—CHARGING FILTERED WATER

| Desalter No. | Volts (Avg.) | Amps. (Avg.) | V.×A. (Avg.) | Line Power Factor | Power Consumption, Watts |
|---|---|---|---|---|---|
| 1 | 422 | 4.2 | 1,772 | | |
| 2 | 425 | 5.1 | 2,168 | | |
| 3 | 425 | 5.8 | 2,465 | | |
| 4 | 423 | 5.4 | 2,284 | | |
| 5 | 423 | 3.9 | 1,650 | | |
| 6 | 419 | 4.9 | 2,053 | | |
| 7 | 425 | 5.8 | 2,465 | | |
| 8 | 428 | 5.4 | 2,311 | | |
| 9 | 430 | 5.0 | 2,150 | | |
| 10 | 420 | 6.2 | 2,604 | | |
| Total | | | 21,922 | 0.966 | 21,177 |

RUN 2.—CHARGING DEGASSED WASTE WATER FROM FLUID UNIT

| Desalter No. | Volts (Avg.) | Amps. (Avg.) | V.×A. (Avg.) | Line Power Factor | Power Consumption, Watts |
|---|---|---|---|---|---|
| 1 | 427 | 4.0 | 1,708 | | |
| 2 | 430 | 4.9 | 2,107 | | |
| 3 | 430 | 5.0 | 2,150 | | |
| 4 | 426 | 5.2 | 2,215 | | |
| 5 | 422 | 3.0 | 1,266 | | |
| 6 | 421 | 4.4 | 1,852 | | |
| 7 | 428 | 5.6 | 2,397 | | |
| 8 | 431 | 5.3 | 2,284 | | |
| 9 | 430 | 5.0 | 2,150 | | |
| 10 | 424 | 5.1 | 2,162 | | |
| Total | | | 20,291 | 0.985 | 19,987 |

$$\text{Ratio: } \frac{\text{Power consumption (Run 2)}}{\text{Power consumption (Run 1)}} = \frac{19,987}{21,177} = 0.944$$

The ratio presented above indicates a 5.6 percent saving in power consumption for the desalters when desalting according to the method of this invention.

A major advantage of the invention is that it permits a substantial reduction in the phenolic content of industrial waste liquors. This result is achieved with only nominal capital investment and with little or no operational costs. Another advantage of the invention is that it reduces or eliminates entirely the use of relatively costly, specially treated, desalting water. A further advantage of the invention is that it simultaneously accomplishes a second necessary operation, namely, the desalting of crude oil. Further, the invention improves the desalting procedure to the extent that the emulsion in the desalters may be broken more quickly and more completely. The invention also substantially reduces in consumption of electrical power in the desalters. An additional advantage of the invention is that it permits the reduction or elimination of ammonia gas injection into the atmospheric distillation system to prevent corrosion due to acidic materials. A still further advantage of the invention is that it converts a substantial portion of the phenolic material in the waste water to salable products by transfer thereof to various fractions of the crude.

It is understood, of course, that numerous modifications of the invention may be practiced without departing from the spirit thereof or the scope of the appended claims.

What I claim is:

1. A process comprising catalytically converting a petroleum oil, distilling the products of said conversion in contact with steam, and during said distillation recovering a first phenolic steam condensate fraction, intimately contacting fresh, inorganic salt-containing crude petroleum oil that is unsaturated to phenols and that contains inorganic salts in a proportion of at least about 40 pounds per thousand barrels, at a temperature of about 140° F. to about 350° F., with about 2 to about 15 percent by volume of phenolic waste water, at least a portion of which is the phenolic steam condensate recovered from the distillation of the products of said catalytic conversion, said phenolic waste water containing a minor fraction of one percent and more than 10 parts per million of phenols, and separating an aqueous phase of reduced phenolic content and containing a major portion of the inorganic salts originally present in the crude petroleum oil, and an oil phase of reduced inorganic salt content and containing a major portion of the phenolic material originally present in said phenolic waste water, facilitating separation of said aqueous and oil phases by subjecting the mixture to the action of an electrical field, distilling the desalted oil phase, in contact with steam to recover an oil fraction suitable for catalytic conversion, and separating a second phenolic steam condensate fraction during said distilling, the total phenol content of all effluent aqueous fractions from the system, other than said first phenolic steam condensate fraction, being substantially less than the phenol content of said first phenolic steam condensate fraction, and continuing the process by catalytically converting said oil fraction suitable for catalytic conversion.

2. A process comprising catalytically cracking gas oil in contact with fluidized cracking catalyst, and distilling the catalytically cracked products in contact with steam, and during the distillation recovering a first phenolic steam condensate fraction, intimately contacting fresh inorganic salt-containing crude petroleum oil that is unsaturated to phenols and that contains inorganic salts in a proportion of at least about 40 pounds per thousand barrels, at a temperature of about 140° F. to about 240° F., with about 2 to about 15 percent by volume of phenolic waste water, a major portion of which is the phenolic steam condensate recovered during the distillation of said catalytically cracked products, said phenolic waste water containing a minor fraction of one percent and more than 10 parts per million of phenols, and separating an aqueous phase of reduced phenolic content and containing a major portion of the inorganic salts originally present in the crude petroleum oil, and an oil phase of reduced inorganic salt content and containing a major portion of the phenolic material originally present in said phenolic waste water, facilitating separation of said aqueous and oil phases by subjecting the mixture to the action of an electrical field, distilling the separated desalted oil phase in contact with steam to recover a gas oil fraction suitable for catalytic cracking, and during said distilling, separating a second phenolic steam condensate fraction, the total phenol content of all effluent aqueous fractions from the system, other than said first phenolic steam condensate fraction, being substantially less than the phenol content of said first phenolic steam condensate fraction, and continuing the process by catalytically cracking the distilled gas oil fraction that is suitable for catalytic cracking.

3. A process comprising catalytically converting a petroleum oil, distilling the products of said conversion in contact with steam, and during said distillation recovering phenolic steam condensate, intimately contacting fresh crude petroleum oil that is unsaturated to phenols and that contains inorganic salts in an objectionable amount sufficient to cause corrosion of refining equipment, at a temperature of about 140° F. to about 350° F., with about 2 to about 15 percent by volume of phenolic waste water, at least a portion of which is the phenolic steam condensate recovered from the distillation of the products of said catalytic conversion, said phenolic waste water containing an objectionable amount in excess of 10 parts per million but not more than a minor fraction of 1 percent of phenols, and separating an aqueous phase of reduced phenolic content that contains a major portion of the inorganic salts originally present in said crude petroleum oil, and an oil phase of reduced inorganic salt content that contains a major portion of the phenolic material originally present in said phenolic waste water, and facilitating separation of said aqueous and oil phases by subjecting the mixture to the action of an electrical field.

4. A process comprising distilling a desalted crude petroleum oil to recover a gas oil fraction suitable for catalytic cracking, catalytically cracking said gas oil in contact with fluidized cracking catalyst, and distilling the catalytically cracked products in contact with steam, and during the distillation recovering phenolic steam condensate, intimately contacting fresh crude petroleum oil that is unsaturated to phenols and that contains inorganic salts in an objectionable amount sufficient to cause corrosion of refining equipment, at a temperature of about 140° F. to about 240° F., with about 2 to about 15 percent by volume of phenolic waste water, a major portion of which is the phenolic steam condensate recovered during the distillation of said catalytically cracked products, said phenolic waste water containing an objectionable amount in excess of 10 parts per million but not more than a minor fraction of 1 percent of phenols, and separating an aqueous phase of reduced phenolic content that contains a major portion of the inorganic salt originally present in the crude petroleum oil, and an oil phase of reduced inorganic salt content that contains a major portion of the phenolic material originally present in said phenolic waste water, and facilitating separation of said aqueous and oil phases by subjecting the mixture to an action of an electrical field, and distilling the separated, desalted oil phase to recover a gas oil fraction suitable for catalytically cracking as described above, and repeating the process.

References Cited in the file of this patent
UNITED STATES PATENTS

| Number | Name | Date |
|---|---|---|
| 1,529,349 | Eddy | Mar. 10, 1925 |
| 1,686,491 | Hughes et al. | Oct. 2, 1928 |
| 1,826,276 | Eddy | Oct. 6, 1931 |
| 1,873,900 | Miller | Aug. 23, 1932 |
| 1,901,228 | Davis et al. | Mar. 14, 1933 |
| 2,030,284 | Diggs | Feb. 11, 1936 |
| 2,048,784 | Drennen | July 28, 1936 |
| 2,134,390 | Greensfelder | Oct. 25, 1938 |
| 2,280,264 | Reeves | Apr. 21, 1942 |
| 2,667,448 | Munday | Jan. 26, 1954 |

OTHER REFERENCES

Hawthorne: "Refiner and Natural Gasoline Manufacturer," vol. 17, No. 6, June 1938, pages 260 to 270. (Copy in Sci. Lib.)